United States Patent [19]

Deakyne et al.

[11] Patent Number: 5,470,409
[45] Date of Patent: Nov. 28, 1995

[54] PROCESS FOR MAKING FLUOROPOLYMER COMPOSITES

[75] Inventors: Clifford K. Deakyne, Wilmington; Gregory P. Weeks, Hockessin, both of Del.

[73] Assignee: E. I. Du Pont de Nemours and Company, Wilmington, Del.

[21] Appl. No.: 279,384

[22] Filed: Jul. 25, 1994

Related U.S. Application Data

[60] Continuation-in-part of Ser. No. 929,902, Aug. 17, 1992, which is a division of Ser. No. 821,567, Jan. 16, 1992, abandoned.

[51] Int. Cl.$^6$ .............................. D21F 11/02; D21J 1/06; B29C 59/02
[52] U.S. Cl. .................. 156/62.4; 156/62.8; 156/311; 156/312; 156/333; 162/146; 264/127; 264/140
[58] Field of Search ............................ 156/624, 628, 156/312, 311, 333; 162/145, 146, 157.5, 132; 264/127, 140; 241/246, 247

[56] References Cited

U.S. PATENT DOCUMENTS

| | | | |
|---|---|---|---|
| 2,578,523 | 12/1951 | Llewellyn | 18/55 |
| 2,999,788 | 9/1961 | Morgan | 162/146 |
| 3,265,557 | 8/1966 | DeFries et al. | 162/138 |
| 3,621,092 | 11/1971 | Hofer | 264/322 |
| 4,049,492 | 9/1977 | Lare | 162/146 |
| 4,163,742 | 8/1979 | Mansure | 260/42.17 |
| 4,414,356 | 11/1983 | Michel | 524/496 |
| 4,422,992 | 12/1983 | Michel | 264/108 |
| 4,543,288 | 9/1985 | Radvan et al. | 428/297 |
| 4,615,853 | 10/1986 | Aoyama et al. | 264/122 |
| 4,824,898 | 4/1989 | Sukigara et al. | 524/401 |
| 5,232,975 | 8/1993 | Deakyne | 524/495 |

FOREIGN PATENT DOCUMENTS

| | | | |
|---|---|---|---|
| 4-188952/26 | 5/1992 | Japan | C08J 5/04 |
| 781512 | 8/1957 | United Kingdom. | |
| 1129757 | 10/1968 | United Kingdom | B01F 3/04 |
| 1329409 | 9/1973 | United Kingdom | D21F 1/00 |
| 9202354 | 2/1992 | WIPO. | |

Primary Examiner—Michael W. Ball
Assistant Examiner—San Chuan Yao

[57] ABSTRACT

A process for the production of structural and semi-structural composites formed by compressing planar layers of nonwoven preform materials formed from aqueous blends of reinforcing fibers and thin thermoplastic fluoropolymer flake. The flakes have an irregular periphery with microfibrils extending therefrom, having a Canadian Standard Freeness of from 800 to 883. The planar layers which are unconstrained in the in-plane direction are preconsolidated by heating the layer to above the melting point of the fluoropolymer, the applying pressure normal to the plane of the layer causing the fluoropolymer to flow thus orienting the fibers in the plane of the layer. The composites are useful in applications which require higher strength and/or modulus, and where chemical and/or heat resistance is needed, as in chemical processing.

5 Claims, 4 Drawing Sheets

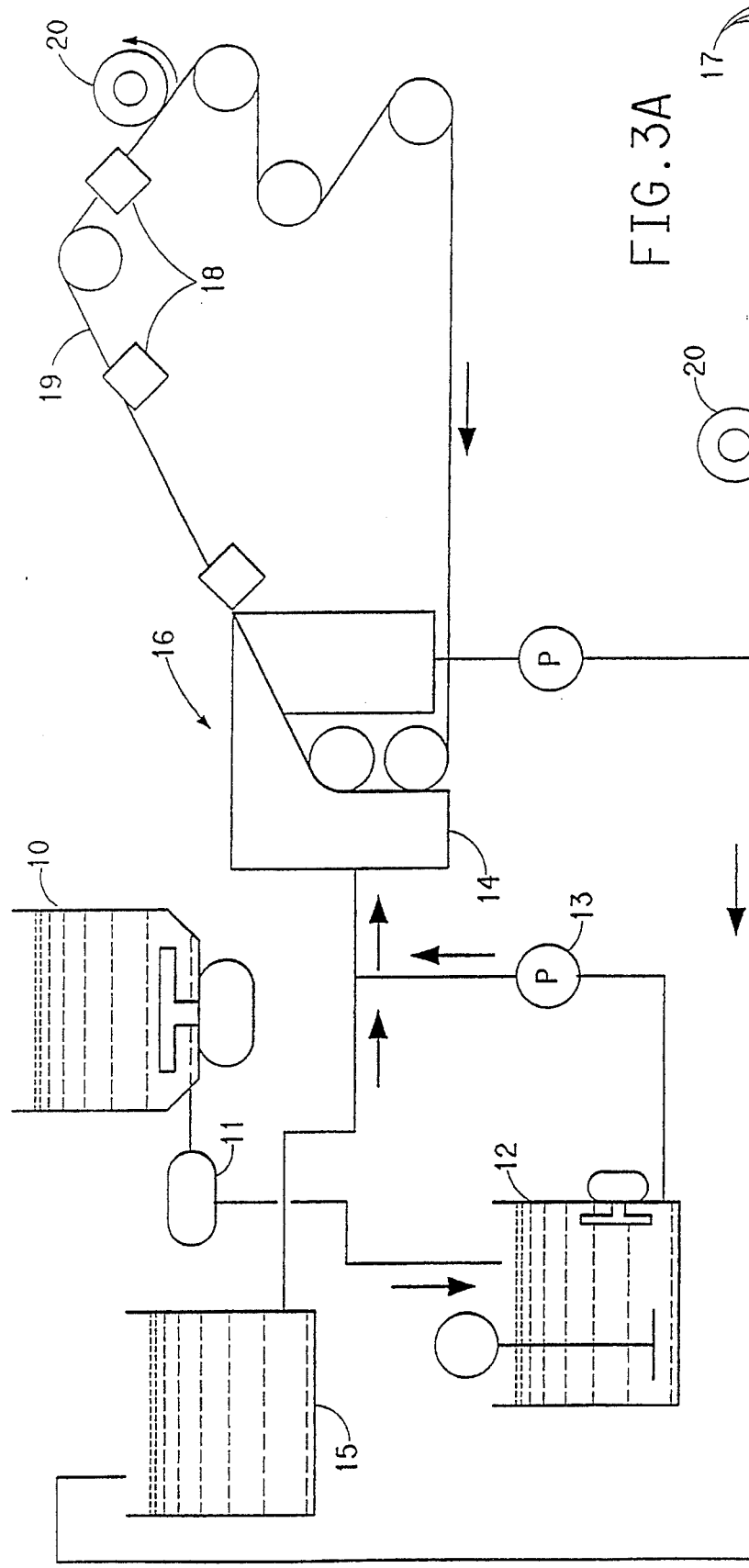
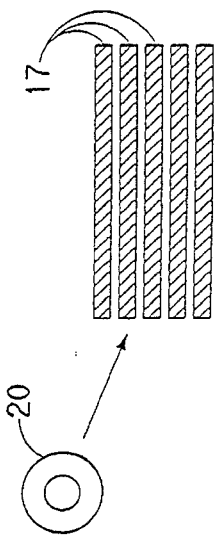

PROCESS FOR MAKING FLUOROPOLYMER COMPOSITES

This is a continuation-in-part of application Ser. No. 07/929,902 filed Aug. 17, 1992 which in turn is a division of application Ser. No. 07/821,567 filed Jan. 16, 1992, now abandoned.

BACKGROUND OF THE INVENTION

1. Field of the Invention

A process for the production of composites containing reinforcing fiber and a fluoropolymer.

2. Technical Background

Polymeric composites consisting of a matrix resin (including fluoropolymers) and a reinforcing fiber are well known in the art. By adding the fiber to the matrix resin certain properties of the resin alone are often improved. These properties can include creep resistance, tensile strength and modulus, and flexural strength and modulus. Generally speaking, the reinforcing fiber chosen has a higher tensile modulus and strength than the polymer alone. When a fluoropolymer is used as the matrix resin, as described herein, the resulting composite often has many of the attributes of fluoropolymers such as high temperature resistance and chemical resistance, which make such composites useful as parts, for example, for the chemical processing industry. It is the object of this invention to provide a method for the production of such fluoropolymer composites that exhibit improved properties.

U.S. Pat. Nos. 4,414,356 and 4,163,742 issued to Michel and Mansure, respectively, describe a process for making tetrafluoroethylene copolymer-graphite fiber composite by mixing the polymer and fiber together in a slurry and then removing the water to obtain an intimate mixture of fiber and polymer. It is also known that fluoropolymers have very low surface energy and are difficult to wet, especially as fine particulates, in aqueous media. Accordingly, the current art depends on the extensive use of organic solvents and emulsifying agents (as in the case of fluoropolymer dispersions) to overcome this obstacle. The amount of "wetting and dispersing" agents in such a slurry according to the art can be comparable to the weight of fluoropolymer resin. These organic dispersion aides must be recovered or disposed as waste. It is highly desirable to find a method for intimately co-dispersing finely divided fluorocarbon and other thermoplastic resins in aqueous media, essentially without the need for solvents and dispersing agents.

SUMMARY OF THE INVENTION

This invention involves a process for the production of a fluoropolymer-fiber composite, comprising: co-dispersing thin thermoplastic fluoropolymer flakes having some irregular fibular structure extending from an irregular periphery and having a Canadian Standard Freeness of greater than 800 up to a maximum of 883 and settling times of from 5 to 130 seconds with reinforcing fibers in an aqueous solution substantially free of other constituents (i.e., less than 1% based on weight of fluoropolymer solids and less than 0.01% based on weight of water in the slurry) to form a homogeneous slurry; feeding the slurry to a screen in a layer; removing water from the layer; drying the layer to form a self-supporting planar preform layer; optionally thermally tacking the web to improve dry strength for handling and preconsolidating said preform layer by heating said preform layer above the fluoro-polymer melt temperature, then applying sufficient pressure normal to the plane of said preform layer to cause the fluoropolymer to flow to form a solid preconsolidated sheet; and cooling said sheet.

This invention involves the use of a "fluoropolymer" as the matrix resin in a polymer-fiber composite. By fluoropolymer is meant an organic polymer that contains at least about 10% fluorine by weight, preferably at least about 45% fluorine by weight, and it is especially preferred if the polymer is perfluorinated, i.e., contains essentially no hydrogen or halogen other than fluorine bound to carbon. The fluoropolymer preferably is converted from a pellet form to unique flake structure advantageous for wet processing by means of a commercial disk refining process using a Sprout Waldron disk refiner with a specific refiner plate design. The flakes have an average size distribution of 250 microns and a thickness of 0.1 times the average length to width dimension.

The fibrous material used in the instant process may be any of a variety of fibers usually used for such purposes. Of course, the fiber must be stable under the process conditions, not decomposing oxidatively or thermally, or reacting with the fluoropolymer. Fibers often used for this purpose include, but are not limited to, glass, graphite (carbon), fluorinated graphite, aramid such as poly(p-phenylene-terephthtalamide), boron nitride, silicon carbide, polyester, and polyamide. Graphite and fluorinated graphite are preferred fibers, and fluorinated graphite is especially preferred.

The fibers may be in a variety of forms for the present process. Preferably, the fiber may simply be chopped fiber that is mixed with the aqueous dispersion.

As is well known to those skilled in the art, polymer-fiber composites with superior properties are produced when there is good adhesion between the polymer and the fiber. It is common in the art to use fibers that have been surface treated with materials to improve this adhesion, and the use of such coated fibers is contemplated herein. Such coated fibers are articles of commerce and individual manufacturers make recommendations as to which fiber (and coating) should be used with any particular polymer.

A preferred route to achieving a highly homogeneous distribution of the fiber and the fluoropolymer is to slurry the two together in water as described in U.S. Pat. No. 4,163,742. By such means blends of fibers and particles can be converted to an open porous mat.

This porous structure is then preconsolidated by heating above the melt temperature of the fluoropolymer but below the melt temperature of the fibers, then applying sufficient pressure normal to the plane of the structure while the material is unconstrained in the inplane directions to cause the fluoropolymer to flow and orient the fibers by means of the flow in the plane of the structure. The structure is cooled under pressure to form a thin solid consolidated sheet.

BRIEF DESCRIPTION OF THE DRAWINGS

FIGS. 3 and 3A are schematic illustrations of the wet-laying process of this invention.

DETAILED DESCRIPTION OF THE PREFERRED EMBODIMENT

Figure 1:
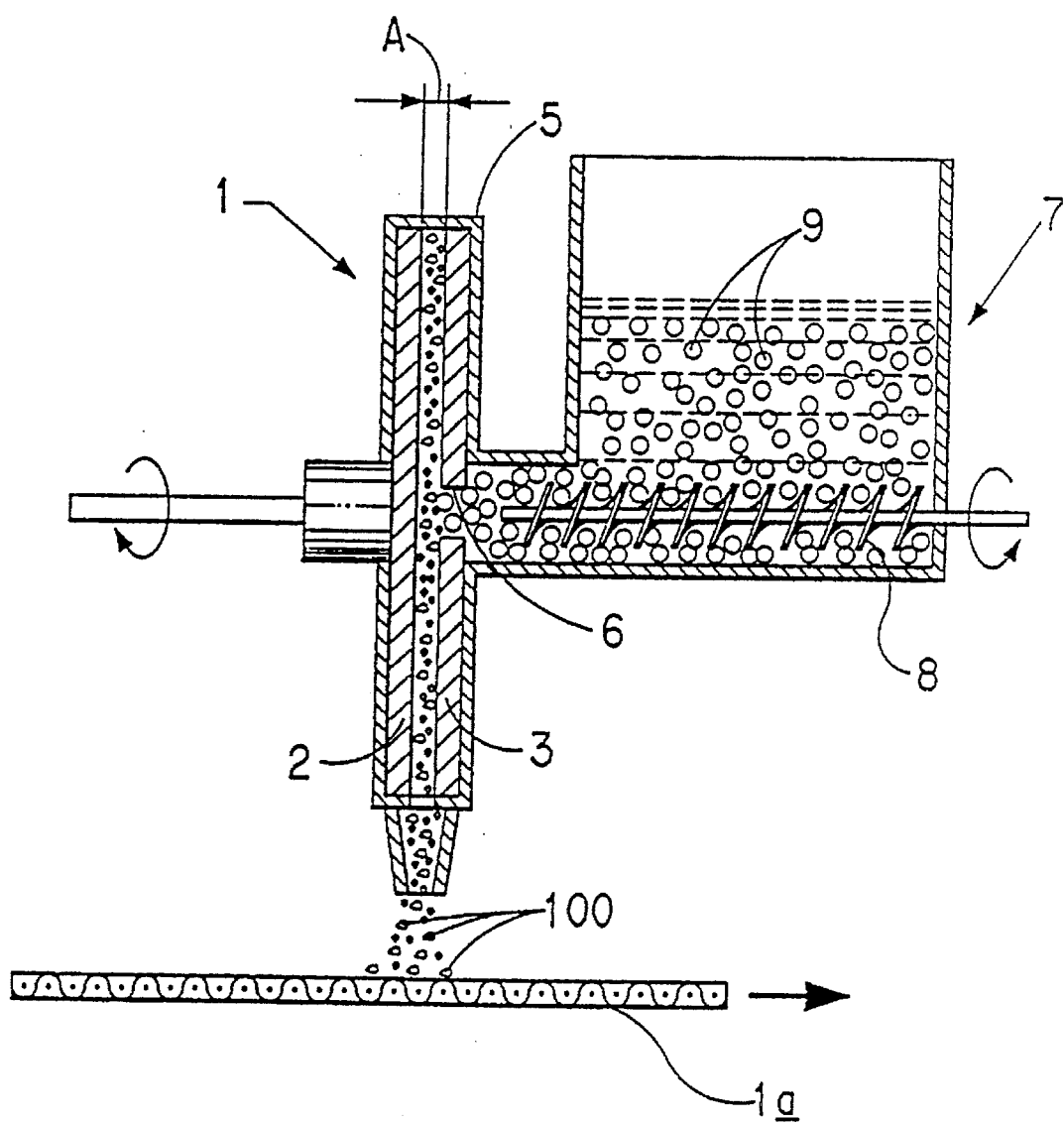
FIG. 1 is a schematic elevation view in section of a disk refining apparatus useful for making the fluoropolymer flakes of this invention.

Referring to FIG. 1, a disk refiner 1 of the type manufactured by Sprout Waldron includes a driven grooved plate 2 separated from a grooved plate 3 fixed to the disk refiner housing 5 by a distance A. A hole 6 through the center of plate 3 is in communication with the material feeder 7 which includes a driven screw 8. In operation, fluoropolymer pellets 9 are fed in a water slurry by means of screw 8 through opening 6 in plate 3 into the disk refiner. The pellets are discharged from the disk refiner in the form of a pulp composed of thin flakes 100 where it is collected on screen 1a.

Figure 2:
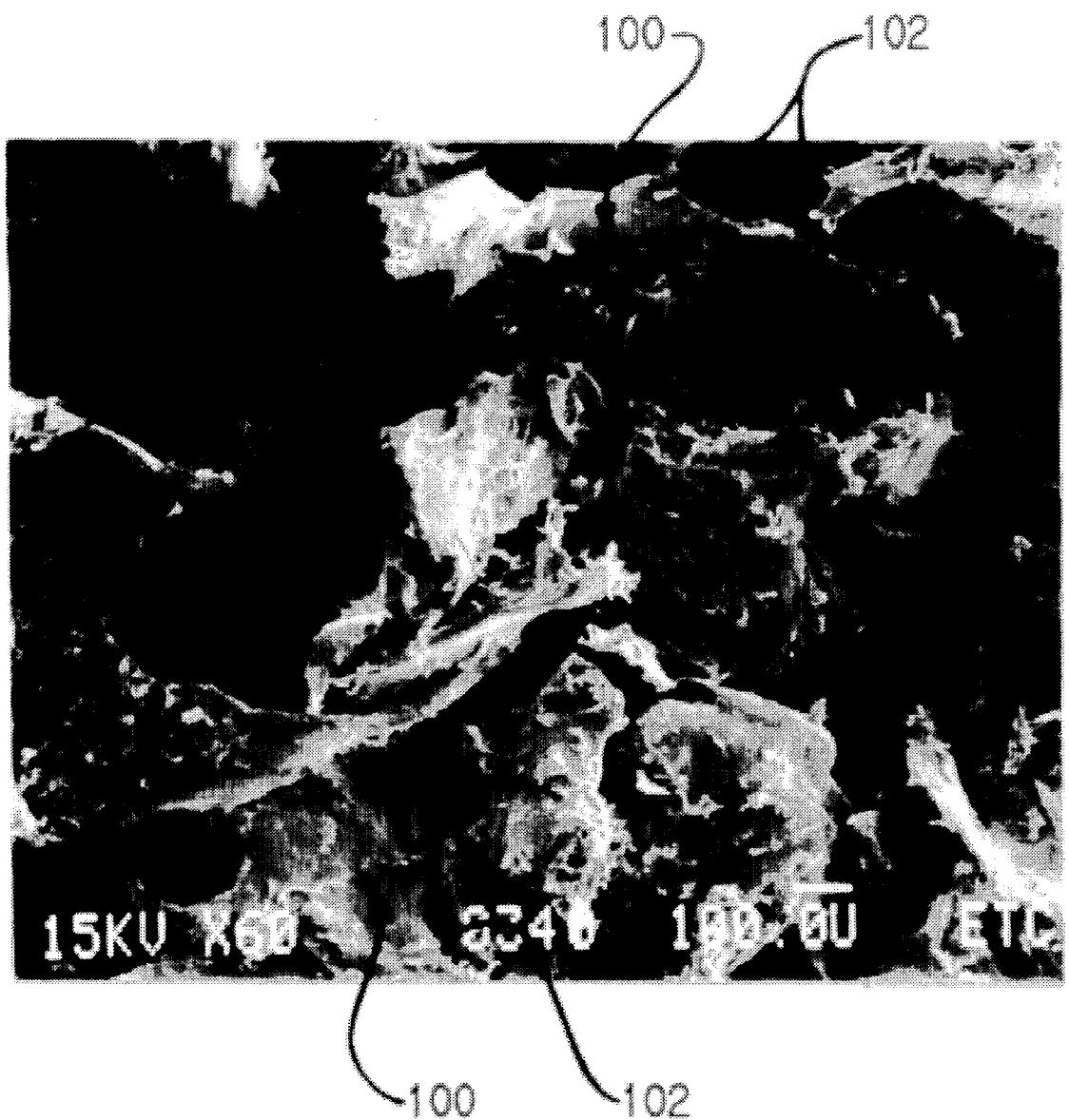
FIG. 2 is a photomicrograph of fluoropolymer flakes of this invention.

The film-like flakes 100 are shown in FIG. 2 to have an irregular periphery with some fibular structures 102 extending from the periphery.

As best shown in FIGS. 3 and 3A, the wet laying process of this invention utilizes paper-making equipment and generally includes a pulper 10, an agitated supply tank 12, the head box 14 of an inclined wire paper machine 16, a dewatering section 18, and a windup or driven spool 20. An optional forced air dryer oven (not shown) may also be used. In operation, fibers and fluoropolymer fiber-like flakes are dispersed in water in pulper 10. The slurry is pumped via pump 11 from the pulper to an agitated supply tank 12. Feed stock from the supply tank is then pumped by means of pump 13 to the head box 14 where dilution water is added from tank 15 reducing stock consistency by a factor of 5. The slurry is drained through the wire in the usual manner and dewatered by passing over suction slots 18 in the dewatering section. The dewatered sheet 19 is then wound in damp form on driven spool 20. The porous sheet wound on the spool 20 is unwound in layers 17 and air dried as schematically shown in FIG. 3A.

| | Equipment Description | | |
|---|---|---|---|
| Element Number | Name | Model No. | Manufacturer |
| 10 | Pulper | GP 157 | Bird Machine Co., Inc. South Walpole, MA |
| 13 | Pump | 23B2-B | Gorman-Rupp Mansfield, OH |
| 16 | Papermaking Machine | Labor 23" | Neu Bruderhaus Reutlingen, W. Germany |

Preconsolidation Process

Figure 4A:
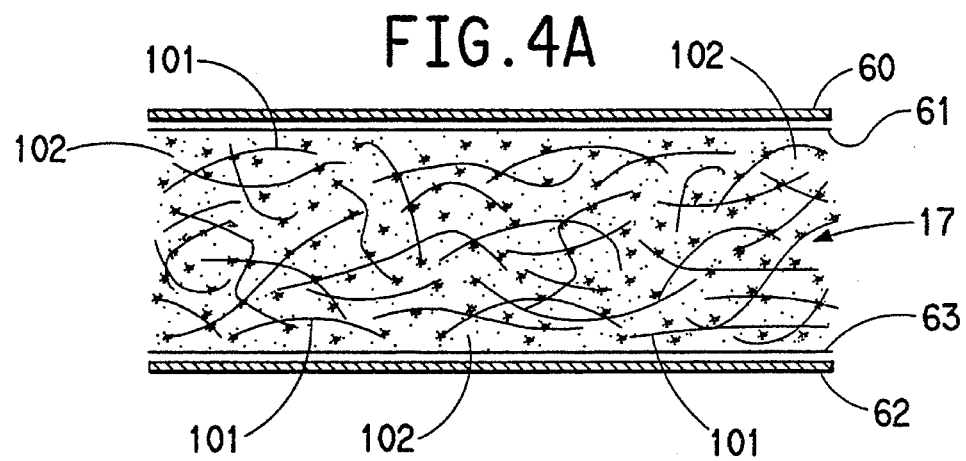
FIGS. 4A–4D are schematic illustrations of the preconsolidation process.
Figure 4B:
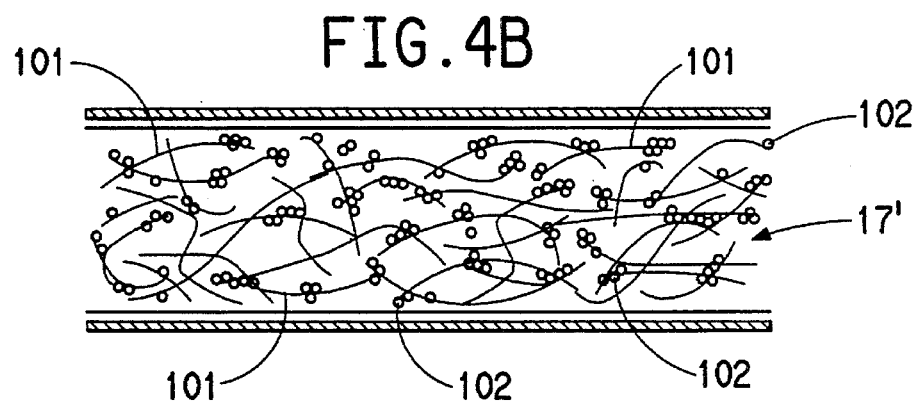
Figure 4C:
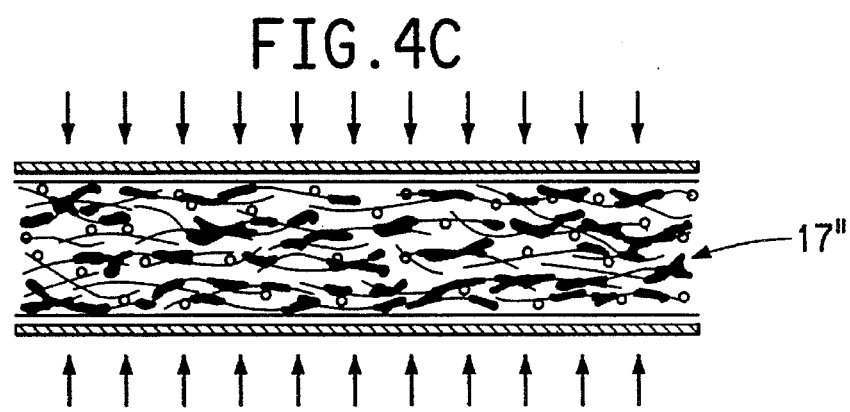
Figure 4D:
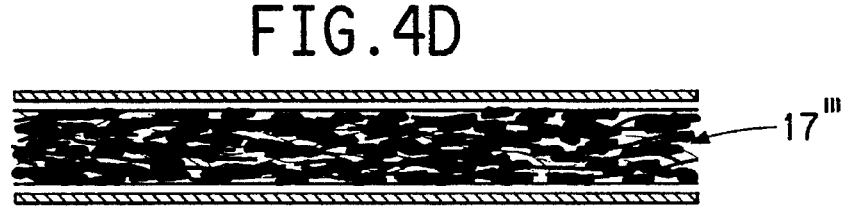

An intermediate process prior to molding of the composite part has been found to provide a product with enhanced strength. As best shown in FIGS. 4A–4D this process involves taking fiber resin layer 17 and placing it between two platens 60, 62. Release films 61, 63 are placed between platens 60, 62 and the preform layer 17 compose of fibers 101 and fluoropolymer particles (102 (FIG. 4A), or the platens must otherwise be treated to prevent sticking of the consolidated layer. The layer 17 is initially under low contact pressure from the platens as heat is applied. The fluoropolymer changes to its molten state as the temperature exceeds the melting point and forms beads 102 on the fibers throughout the layer 17' (FIG. 4B). Pressure is then applied to the platens 60, 62 causing the molten fluoropolymer to flow in layer 17" (FIG. 4C), and since the mix is in an unconstrained state at the edges of the platens, i.e., in the in-plane directions, the fibers are moved along with the polymer giving them a planar arrangement of fibers coated with molten fluoropolymer in layer 17''' (FIG. 4D). Since the mix is unconstrained in-plane, there are no compression forces on the plane and no buckling occurs. The preconsolidated sheet is then cooled under pressure. This same sequence of events can be achieved on a continuous basis using a heated belt press or similarly a heating zone and nip rolls. The process requires that the resin is heated above the melt, then pressure is applied causing flow, and the composite is cooled under pressure.

The preconsolidated sheet is then shaped into an article by subjecting the structure to heat and pressure for a sufficient amount of time to form it. The temperature, pressure and time required to do this will vary with such factors as the polymer, polymer viscosity, fiber configuration, and thickness. The polymer will usually be heated close to or above its glass transition or melting temperature, whichever is higher. It is possible to cause polymer flow below these temperatures, but it usually requires longer times and higher pressures. The pressure and time required is generally related to the polymer viscosity at the process temperature. The higher the viscosity, the higher the pressure and/or longer the time required. These factors are also affected by the fiber loading, with higher loadings generally requiring higher pressures and/or longer times. For any particular composition, these factors are readily determined by routine experimentation.

Pressure may be applied, for example, while the structure is in a die in a compression press, or if a flat sheet is desired, between the (heated) platens of a compression press. Other types of suitable equipment will be apparent to the art skilled.

The instant process yields composite articles superior to those of the prior art, particularly in regard to certain physical properties such as tensile strength. It is hypothesized that this occurs because of a more even distribution of the fluoropolymer in the composite, particularly in relationship to the fiber present.

In the following Examples, Teflon® PFA is a registered trademark of and available from E. I. du Pont de Nemours and Company, Wilmington, Del., and is a polymer containing about 99 mole percent tetrafluoroethylene and 1 mole percent perfluoro(propyl vinyl ether). Hercules AS 1815 is a graphite fiber available from Hercules, Inc., Wilmington, DE. BASF Celion 6 ns in a graphite fiber from BASF, Inc., Charlotte, S.C.

TEST PROCEDURES

Freeness is determined by the TAPPI test T227 OM 85. The data obtained from this test are expressed as the familiar Canadian Standard Freeness numbers which represent the number of ml. of water which drain from the slurry under specified conditions.

Settling time for refined particles of PFA is determined by adding 10 grams of PFA particles to 180 ml. of water with 1 drop of detergent in a clear glass container with a sealed cap. The container is shaken three times and the time for materials to settle to the bottom of the container is measured with a stop watch. This is done 7 times for each sample and an average settling time is determined.

EXAMPLES

Example 1

Using a commercial Sprout Waldron 12 inch laboratory disk refiner, model 105A, substantially as described in FIG. 1 driven at 1800 rpm with a combination of grooved plates, the position of the plates set at a distance of 0.001 inch from each other. The refiner is fitted with a conventional screw feeder and fitted with piping to provide a nominal 9 liters per minute process water flow through the feeder to the refiner housing where nominal ⅛ inch pellets of Teflon® PFA* resin are fed to the screw feeder at a rate of 25–50 pounds per hour, the refiner motor load is monitored to limit the feed rate by manual means to limit the motor load to 30% (motor idle load is 24%). The resultant refined thermoplastic fluoropolymer pulp of thin flakes discharging from the refiner is collected on a 100 mesh screen. The size distribution of thin flakes ranged from 50 to 700 microns in length/width with an average of approximately 250 microns, and the thickness of the flakes as measured by cross-sectional photomicrographs was less than 0.1 times the average length/width dimension. Photomicrographic inspection showed the individual flakes, irregular in planar dimension, with microfibrals extending from the edges. The thin flakes were observed to disperse easily in water with hand stirring with less than 1% surfactant.

A slurry of thin flakes made in this example are observed to have a Canadian Standard Freeness of about 880.

Example 2

This example is prepared on a paper machine as represented by FIG. 3. More particularly, a 150 gallon total capacity Bird Pulper 10 is filled to two-thirds capacity (110 gallons) with deionized water. A quantity of Hercules Type 1815 wet dispersible, 0.25 inch cut length carbon fiber is added to the pulper and dispersed for 5 minutes at minimum agitation to obtain a uniform slurry dispersion. Disk refined Teflon® PFA* 340 flakes are added and dispersed with moderate agitation for two additional minutes to create a uniform co-dispersed slurry consisting of the carbon fiber and Teflon® PFA* material. The pulper slurry is pumped to a moderately agitated machine supply tank 12 and further diluted such that the consistency is approximately 0.25% by weight solids. The feed stock was then pumped via pump 13 to the headbox of a 12 inch Bruderhaus inclined wire mini-paper machine having a 45 degree incline on the forming wire 19. The stock is diluted at the headbox 16 to a consistency of 0.05% using water from tank 15. The headbox stock is deposited into the forming wire 19 in the usual manner and dewatered by passing over suction slots 18. The wire speed is 5 fpm and the resulting sheet was captured on a take-up roll 20 in damp form as a blended sheet of carbon fiber and PFA, being easily transferred without fiber/resin distribution disruption. The sheet was then laid out in layers 17 and air dried to ambient moisture level. The dry sheet weight was approximately 0.05 pounds per square foot.

Example 3

A sheet from the product made according to Example 2 was layered on a plate covered with Kapton® film making a 2'×2' stack 3 ply deep. The plate was put into a heated platen press at 250° F. to dry for over 4 hours. The dried stack was subsequently preconsolidated into a sheet by sandwiching between Kapton® and steel plates and pressing.

A cycle of preheat at contact pressure for 15 minutes at 700° F. is followed by 30 minutes at 200 ton force at 700° F. The stack was then transferred to a cold press and cooled under pressure of 200 tons to form a solid preconsolidated sheet.

The preconsolidated sheet was cut into 3"×6" pieces and put into a 3"×6" picture frame mold" to mold a 0.6" thick block. The mold was heated under contact pressure in a press heated to 680° F. until the mold reached 660° F., then held under 500 psi for 20 minutes and cooled in place under pressure.

The properties of the block were:

| Flex Mod (Ksi)* | Flex Strength (Psi)* | Flatwise Compression (Psi)** |
|---|---|---|
| 1,495 | 17,904 | 29,174 |
| 1,444 | 17,741 | 28,524 |
| 1,465 | 18,559 | 28,105 |
| 1,468 | 18,068 | 28,607 |

The block had a density of 2.035 grams/cm³.
*measured per ASTM D790 using ½" × 6" × ⅛" thick bars
**measured per ASTM C-365-57 using 1" × 1" × 0.6" thick specimens.

Example 4

The fiber/resin product according to U.S. Pat. No. 4,163,742 was made by adding 10.6 pounds of Teflon® PFA 3740 powder by DuPont to 15 pounds of acetone in a Littleford lab mixer. This was blended with 57 pounds of water, then 2.6 pounds of BASF Celion 6ns 0.25 in carbon fiber was added. After mixing, the mix was filtered and the wet resin/fiber was dried in a Class A oven.

A test block was made according to the stepwise filling and cold compression method described in U.S. Pat. No. 4,163,742, then consolidated. A 7.5×7.5" deep draft mold was loaded with fiber and pressed at 5000 psi, then reloaded and repressed until enough fiber was added for a 1" final thickness. The mold with the cold compacted mass was then loaded into a press with a 660° F. platen temperature and held at 400 psi for 2 hours after the mold reached 650° F. then cooled under pressure until the mold was below 300° F.

A sheet was made according to the preconsolidation process of this invention by piling the resin/fiber in the center of a Kapton covered plate, then covering with another Kapton covered plate, then heating to 700° F. at contact pressure for 10 minutes, then pressing normal to the plane of the plate at 700 psi for 20 minutes while resin/fiber material is unconstrained in the in-plane direction and cooling under pressure. Another test block (0.8" final thickness) was made by die cutting about 20 plies of the preconsolidated sheet material and molding in the same mold with the same hot molding cycle as above. Preconsolidation of PFA/carbon fiber combinations resulted in significant improvements in final part properties as shown in the table below:

TABLE

Comparison of Molding Processes
Based on Final Test Block Properties
(Mean Values)

|  | Via U.S. Pat. No. 4,163,742 | Preconsolidated Process |
|---|---|---|
| Compressive Strength (Ksi)** | (1) 22.0 | 29.0 |
| Flexural Strength* | (1) 17.0 | 19.8 |
| Flexural Modulus (Msi)* | (1) 1.3 | 1.9 |
| Compressive Strength | (2) 8.0 | 18.3 |
| Flexural Strength | (2) 16.0 | 22.1 |
| Flexural Modulus | (2) 1.2 | 1.8 |

*measured per ASTM 0790 using ⅛" thick × ½" × 7 ½" bars
**measured per ASTM C-365-57 using ½" cubes Example 5

Fiber length distributions were measured for other samples made with the process described above. Lengths for the starting fiber, the process via U.S. Pat. No. 4,163,742 and from this process are compared below.

| Measured Fiber Length in cm | | |
|---|---|---|
| Unprocessed Fiber | Processed Via U.S. Pat. No. 4,163,742 | Preconsolidation Process |
| 0.722 | 0.250 | 0.556 |
| 0.667 | 0.417 | 0.444 |
| 0.769 | 0.361 | 0.324 |
| 0.722 | 0.407 | 0.574 |
| 0.685 | 0.120 | 0.389 |
| 0.704 | 0.380 | 0.176 |
| 0.713 | 0.528 | 0.333 |
| 0.694 | 0.556 | 0.213 |
| 0.704 | 0.093 | 0.176 |
| 0.704 | 0.139 | 0.333 |
| 0.731 | 0.213 | 0.139 |
| 0.713 | 0.231 | 0.463 |
| 0.713 | 0.259 | 0.130 |
| 0.731 | 0.176 | 0.194 |
| 0.731 | 0.583 | 0.407 |
| 0.694 | 0.324 | 0.120 |
| 0.731 | 0.250 | 0.296 |
| 0.731 | 0.537 | 0.380 |
| 0.731 | 0.472 | 0.315 |
| 0.741 | 0.222 | 0.528 |
| 0.694 | 0.463 | 0.630 |
| 0.704 | 0.352 | 0.667 |
| 0.704 | 0.352 | 0.463 |
| 0.722 | 0.093 | 0.435 |
| 0.694 | 0.269 | 0.574 |
| 0.722 | 0.259 | 0.389 |
| 0.685 | 0.139 | 0.602 |
| 0.694 | 0.102 | 0.759 |
| 0.722 | 0.259 | 0.685 |
| 0.722 | 0.343 | 0.537 |
| Avg. 0.713 | 0.305 | 0.408 |

Example 5

10 Grams of PFA of a particular particle size was put in a clear glass container with 180 ml. of water and 1 drop of detergent and the container was sealed. The container was shaken 3 times and the time for the particles to settle to the bottom of the container was measured with a stop watch. The shaking three times and settling time was repeated 7 times for each sample with the following results.

| Average Particle Size (Microns) | Settling Time (Seconds) | Settling Time Standard Deviation (Seconds) |
|---|---|---|
| 3300 | 1.03 | 0.38 |
| 450 | 5.89 | 2.21 |
| 300 | 39.00 | 16.00 |
| 250 | 130.00 | 21.00 |
| <50 | particles float | — |

Example 6

To an 8000 gallon side agitated blend tank, 6000 gallons of water was added. 62.5 pounds of Hercules AS4 chopped carbon fiber having on its surface 0.5% polyvinylpyrrolidone sizing is added to the tank and agitation is continued for 10 minutes to form a well dispersed slurry of individual carbon fibers in water. Next, 250 pounds of PFA 340 disk refined fluoropolymer pulp is added to the water in the tank and agitation continued for an additional 15 minutes. This slurry stock is 0.62% consistency=(weight/solids/weight water×100). The stock was then fed at the rate of 110 gallons per minute into the recirculating white water loop of the paper machine providing a dilution to about 0.062% consistency at the head box. At the head box, a sheet was formed having a dry equivalent basis weight of approximately 0.11 pounds per square foot using modified inclined rotary wire forming equipment. The head box stock was drained through the forming wire and dewatered by passing over suction slots in the usual manner. The wire speed was 25 fpm. The damp sheet was then passed through a forced hot air circular oven having an air temperature of 620° F. Residence time in the drying oven was 40 seconds, which was sufficient to both dry the product and to bond the disk refined fluoropolymer particles. The resulting bonded sheet is then wound-up in mill roll form.

What is claimed is:

1. A process for the production of a fluoropolymer-fiber composite comprising:

(a) preparing thin thermoplastic fluoropolymer flakes having an irregular periphery with an irregular microfibular structure extending therefrom by disc refining fluoropolymer pellets, said flakes having a Canadian Standard Freeness greater than 800, then co-dispersing said flakes with fibers in an aqueous solution to form a homogenous slurry;

(b) feeding the slurry to a screen in a layer;

(c) removing water from the layer; and (d) drying the layer to form a thin self-supporting porous fluoropolymer-fiber planar preform layer.

2. The process as defined in claim 1 wherein said drying step includes passing the layer through a hot air oven at an air temperature and residence time to thermally tack the flakes to the fibers in the layer.

3. A process for the production of a fluoropolymer-fiber composite comprising:

(a) preparing thin thermoplastic fluoropolymer flakes having an irregular periphery with an irregular microfibular structure extending therefrom by disc refining fluoropolymer pellets, said flakes having a Canadian Standard Freeness greater than 800, then co-dispersing said flakes with fibers in an aqueous solution to form a homogenous slurry;

(b) feeding the slurry to a screen in a layer;

(c) removing water from the layer;

(d) drying the layer to form a thin self-supporting porous fluoropolymer-fiber planar preform layer;

(e) preconsolidating said planar preform layer by heating said planar preform layer to above the melt temperature of the fluoropolymer, then applying sufficient pressure normal to the plane of the preform layer while the preform layer is unconstrained in the in-plane direction to cause the fluoropolymer to flow orienting the fibers in substantially the plane of the layer by means of said flow to form a preconsolidated sheet;

(f) cooling said sheet; and (g) forming a solid shaped composite from a stack of said sheets by heating said stack to a high enough temperature and applying sufficient pressure for a sufficient amount of time to form said solid shaped composite.

4. The process as defined in claim 1, or claim 2, wherein said fibers are carbon fibers.

5. The process as defined in claims 1 or 2, wherein said fluoropolymer flakes have a settling time of from 5 to 130 seconds.

* * * * *